US 9,437,251 B1

(12) United States Patent
Rudy et al.

(10) Patent No.: US 9,437,251 B1
(45) Date of Patent: Sep. 6, 2016

(54) APPARATUS AND METHOD HAVING TDMR READER TO READER SHUNTS (71) Applicant: Western Digital (Fremont), LLC, Fremont, CA (US)

(72) Inventors: Steven C. Rudy, Carmel Valley, CA (US); Luc Ving Chung, Fremont, CA (US); Christopher L. Beaudry, San Jose, CA (US); Shaoping Li, San Ramon, CA (US); Jimmy J. Shen, Fremont, CA (US); Guolun Hao, Dublin, CA (US); Yingbo Zhang, San Ramon, CA (US)

(73) Assignee: WESTERN DIGITAL (FREMONT), LLC, Fremont, CA (US)

(*) Notice: Subject to any disclaimer, the term of this patent is extended or adjusted under 35 U.S.C. 154(b) by 0 days.

(21) Appl. No.: 14/579,785

(22) Filed: Dec. 22, 2014

(51) Int. Cl.
G11B 5/39 (2006.01)
G11B 5/115 (2006.01)
G11B 5/29 (2006.01)
G11B 33/14 (2006.01)
G11B 5/60 (2006.01)
G11B 5/48 (2006.01)
G11B 5/49 (2006.01)
G11B 5/31 (2006.01)

(52) U.S. Cl.
CPC ............ *G11B 33/1493* (2013.01); *G11B 5/115* (2013.01); *G11B 5/29* (2013.01); *G11B 5/3912* (2013.01); *G11B 5/3951* (2013.01); *G11B 5/3977* (2013.01); *G11B 5/3163* (2013.01); *G11B 5/4886* (2013.01); *G11B 5/4976* (2013.01); *G11B 5/6094* (2013.01); *Y10T 29/49032* (2015.01)

(58) Field of Classification Search
None
See application file for complete search history.

(56) References Cited

U.S. PATENT DOCUMENTS

| 5,255,141 A | 10/1993 | Valstyn et al. |
| 5,699,212 A | 12/1997 | Erpelding et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |

(Continued)

*Primary Examiner* — Craig A. Renner (57) ABSTRACT

A method of making a magnetic head is provided. The method includes forming a first read sensor and a first electrical contact formed with a first shunt region. The method further includes forming a first mid-shield layer on the first read sensor, the first mid-shield layer being electrically connected to the first electrical contact. Additionally the method also includes forming a second mid-shield layer over the first mid-shield layer. Further, the method also includes forming a second read sensor over the second mid-shield layer, the second read sensor having a second electrical contact formed with a second shunt region electrically connected to the first shunt region.

9 Claims, 5 Drawing Sheets (56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,361 B2 | 3/2003 | Cain et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,459 B2 | 10/2003 | Heim et al. |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,643,106 B2 | 11/2003 | Bougtaghou et al. |
| 6,650,503 B1 | 11/2003 | Chen et al. |
| 6,650,506 B1 | 11/2003 | Risse |
| 6,650,519 B1 | 11/2003 | Karr et al. |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,846,991 B2 | 1/2005 | Girard et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,119,995 B2 | 10/2006 | Granstrom et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,291,279 B2 | 11/2007 | Dill et al. |
| 7,292,400 B2 | 11/2007 | Bishop |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,375,931 B2 | 5/2008 | Jayasekara et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,392,579 B2 | 7/2008 | Leung et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |

(56) References Cited

U.S. PATENT DOCUMENTS

| | | |
|---|---|---|
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,545,608 B2 | 6/2009 | Araki et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,107,200 B2 | 1/2012 | Leung et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,199,444 B2 | 6/2012 | Golcher et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |

(56) References Cited

U.S. PATENT DOCUMENTS

| | | |
|---|---|---|
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,226 B2 | 11/2013 | Tetzlaff et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,891,207 B1 * | 11/2014 | Li et al. .............. G11B 5/115 360/319 |
| 8,908,333 B1 * | 12/2014 | Rudy et al. .......... G11B 5/115 360/319 |
| 9,042,058 B1 * | 5/2015 | Li et al. .............. G11B 5/3912 360/316 |
| 9,087,527 B1 * | 7/2015 | Li et al. .............. G11B 5/3958 |
| 2004/0218309 A1 | 11/2004 | Seigler |
| 2004/0264065 A1 | 12/2004 | Ionescu et al. |
| 2007/0081278 A1 | 4/2007 | Feldbaum et al. |
| 2008/0066294 A1 | 3/2008 | Mahadev et al. |
| 2009/0168213 A1 | 7/2009 | Araki et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

APPARATUS AND METHOD HAVING TDMR READER TO READER SHUNTS

BACKGROUND

Figure 1A:
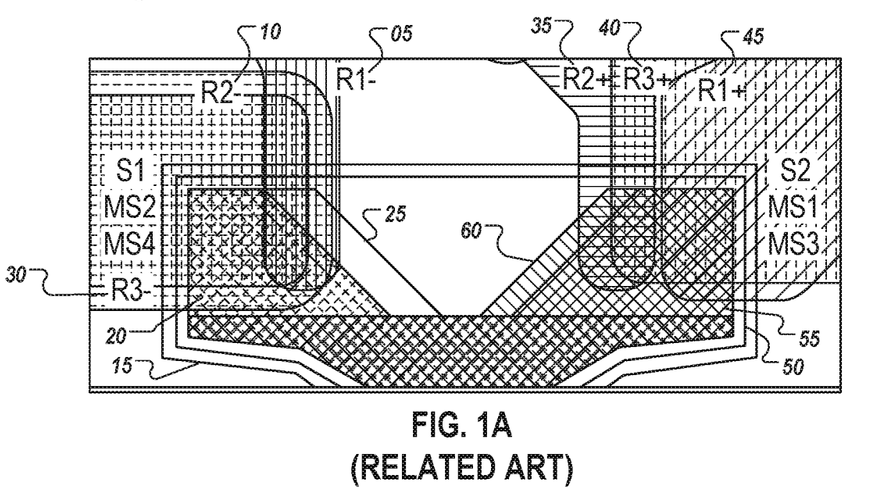
FIG. 1A illustrates a plan view of the related-art read transducer 1 and FIG. 1B illustrates a schematic view of the related-art two-dimensional read transducer 1.
Figure 1B:
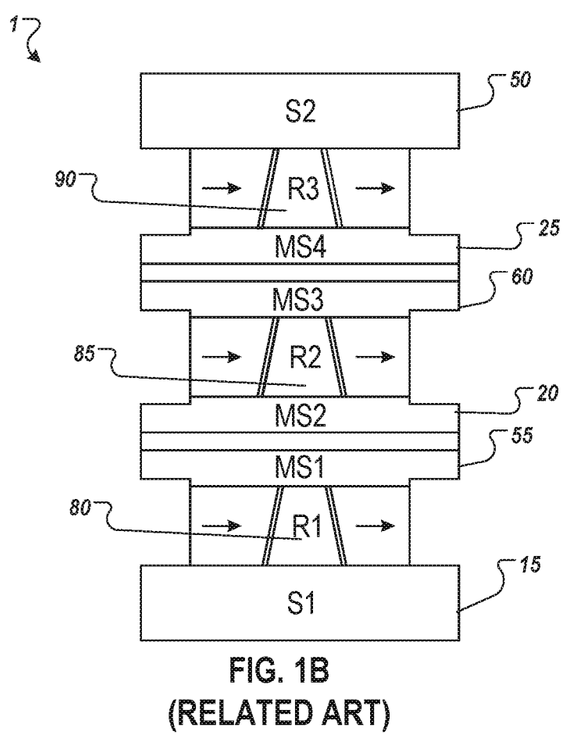

FIGS. 1A-1B illustrate a related-art two-dimensional magnetic recording (TDMR) transducer 1. Specifically, FIG. 1A illustrates a plan view of the related-art read transducer 1 and FIG. 1B illustrates a schematic view of the related-art two-dimensional read transducer 1. As illustrated, the related-art read transducer may include the two outer shields (15, 50), four mid-shields (20, 25, 55, 60), and three read sensors (80, 85, 90), each having two terminals for a total of six terminals (05, 10, 30, 35, 40, 45). The two outer shields include a first outer shield (S1) 15 and a second outer shields (S2) 50. The four mid-shields include a first mid-shield (MS1) 55, a second mid-shield (MS2) 20, a third mid-shield (MS3) 60, and a fourth mid-shield (MS4) 25.

The three read sensors (illustrated in FIG. 1B) include a first read sensor (R1) 80, a second read sensor (R2) 85, and a third read sensor (R3) 90. The first read sensor (R1) 80 includes a negative terminal (R1−) 05 and a positive terminal (R1+) 45. The second read sensor (R2) 85 also includes a negative terminal (R2−) 10 and a positive terminal (R2+) 35. Further, the third read sensor (R3) 90 includes a negative terminal (R3−) 30 and a positive terminal (R3+) 40.

By employing multiple sensor array designs, TDMR technology may enable multi-terabit density recording. In principle TDMR operation schemes may require the read sensor array structure of the TDMR transducer be longitudinally aligned along the cross track direction with little or no separation to allow different signals to be obtained at the same data track locations simultaneously during read back process. However, a TDMR transducer 1 may suffer a misalignment between adjacent sensor locations and the actual tracks of interests due to skew angle and radius conditions.

Providing smaller vertical separation between adjacent sensors may reduce a skew angle causing misalignment. However, this requires very thin insulating films to separate one reader's mid-shield from the next reader's mid-shield. Such thin insulating films may suffer from Electrical Overstress (EOS) or Electrostatic Discharge (ESD) during manufacturing. The chance of EOS or ESD increases as more read sensors are added between the first outer shield (S1) 15 and a second outer shields (S2) 50. Accordingly, what is needed is a system and method for improving the manufacturing of a magnetic recording read transducer, particular for a TDMR.

DETAILED DESCRIPTION OF THE EXEMPLARY IMPLEMENTATIONS

Figure 2:
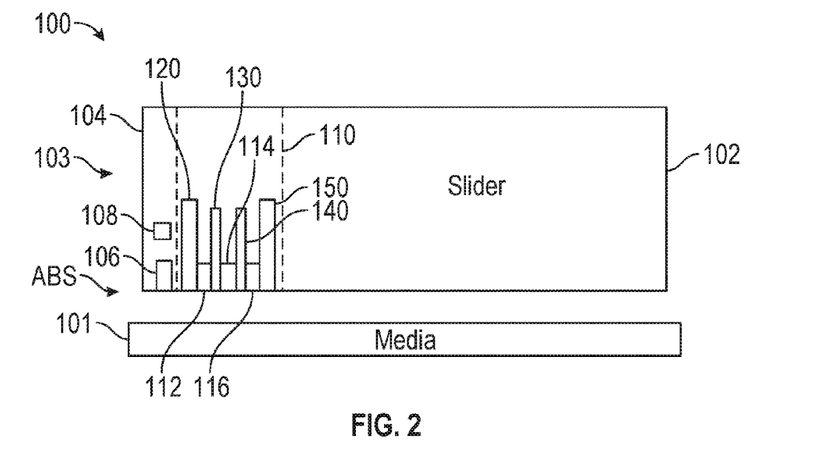
FIG. 2 is a schematic view illustrating an exemplary implementation of a disk drive.
Figure 3:
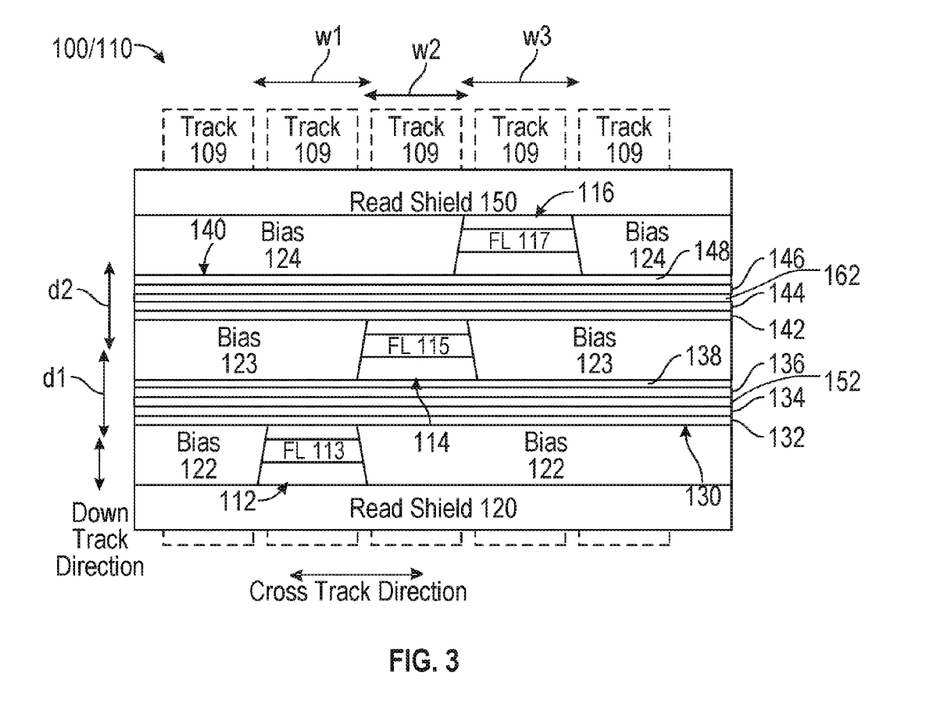
FIG. 3 is an ABS view illustrating a portion of a two-dimensional read transducer manufactured from an exemplary implementation of a microstructure of the present application.
Figure 4:
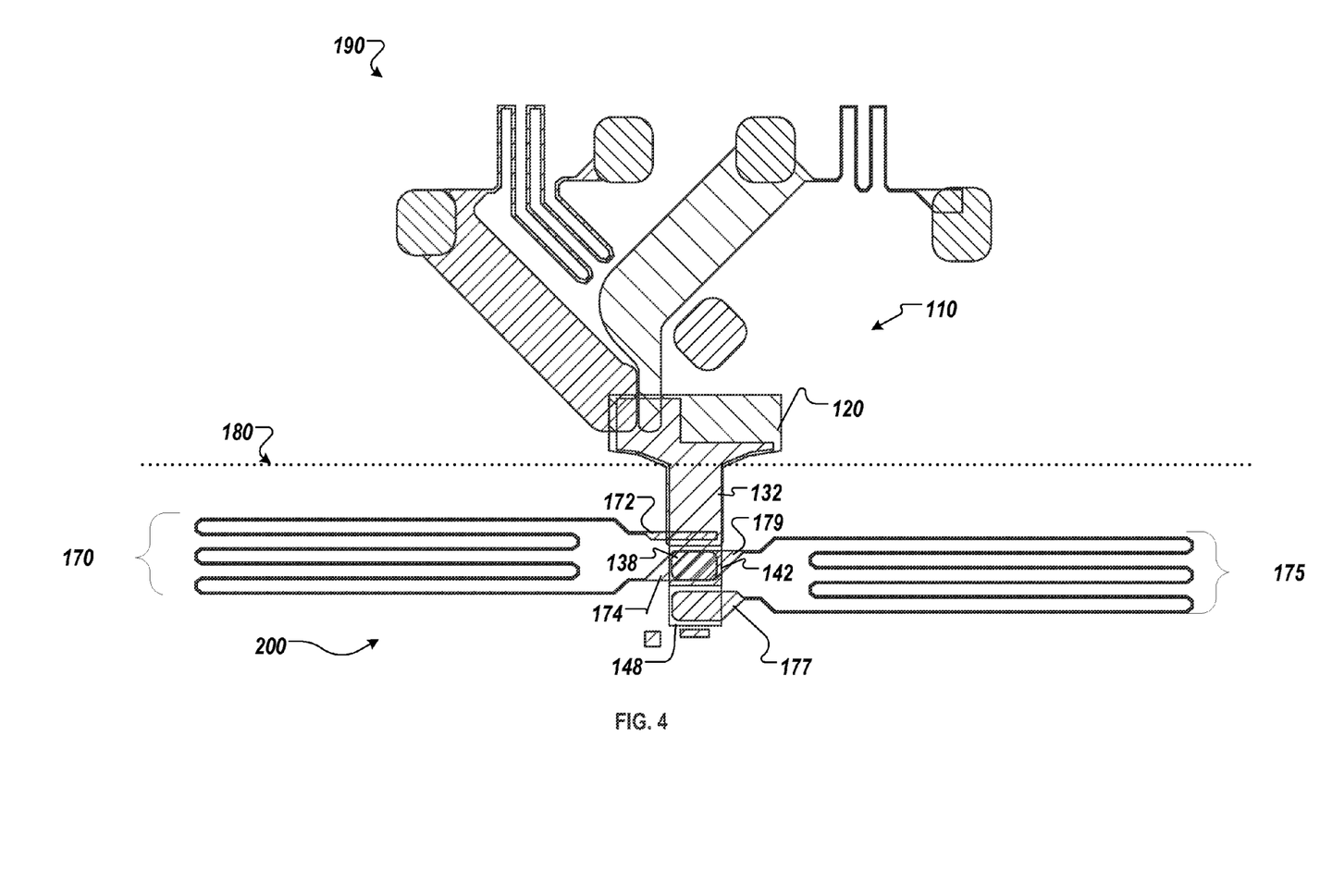
FIG. 4 is a plan view of the exemplary implementation of the microstructure of the present application.

FIGS. 2-3 depict side and Air Bearing Surface views of a storage drive or disk drive 100. For clarity, FIGS. 3 and 4 are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The media 101 includes tracks 109. The write transducer includes at least a write pole 106 and coil(s) 108 for energizing the pole 106. Additional and/or different components may be included in the disk drive 100. The slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other implementations, only a read transducer 110 may be present.

The read transducer 110 includes multiple read sensors 112, 114 and 116. The read sensors 112, 114 and 116 include sensor layers 113, 115 and 117, respectively, that may be free layers (FL) in a magneto resistive junction such as a tunneling magneto resistive (TMR) sensor (such as a current-perpendicular-to-plane (CPP) TMR sensor). As may be apparent to a person of ordinary skill in the art, other types of sensors (such as a giant magneto resistive (GMR) sensor) may also be used. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIG. 3. The sensors 112, 114 and 116 may also include seed layer(s) (not shown) and capping layer(s) (not shown). The pinning layer is generally an AFM layer that is magnetically coupled to the pinned layer. In other implementations, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer. Although depicted as a GMR or TMR sensor, in other implementations, other structures and other sensing mechanisms may be used for the sensor.

The read sensors 112, 114 and 116 are separated by distances d1 and d2 in a down track direction. The down track direction is perpendicular to the cross track direction. The cross track direction and track width direction are the same. In the implementation shown, the distance d1 and d2 between the sensors 112 and 114 and between the sensors 114 and 116, respectively, are the same. However, in other implementations, the distances between the sensors 112, 114 and 116 may not be the same. It may generally be desirable to reduce the distance between the sensors 112, 114 and 116 to reduce the skew effect discussed above. In some implementations, the distances d1 and d2 may each be at least ten nanometers and not more than four hundred nanometers. The read sensors 112, 114 and 116 may have various widths, w1, w2 and w3, respectively, in the track width, or cross-track, direction. In some embodiments, the various widths, w1, w2, and w3 the widths may be substantially equal. However, in other implementations, different widths may be possible. The widths of the sensors 112, 114 and 116 may also be based on the track pitch. The track pitch is the distance from the center of one track to the center of the next track. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. In the implementation shown, none of the read sensors 112, 114 and 116 are aligned along a vertical line that runs in the down track direction. In other implementations, some or all of the read sensors 112, 114 and 116 may be aligned. The read sensors 112, 114 and 116 may also partially overlap in the track width/cross track direction. However, in other implementations, the read sensors 112, 114 and 116 may be aligned.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other implementations, the magnetic bias structure(s) 122, 123 and/or 124 may be hard magnetic bias structures. Other mechanisms for biasing the sensors 112, 114 and 116 might also be used.

The read sensors are separated by shields 130 and 140. The read sensors 112, 114 and 116 and mid-shields 130 and 140 are surrounded by read shields 120 and 150. Thus, as used herein, a mid-shield shield may be considered to be an internal shield, which is interleaved with read sensors 112, 114 and 116 and between the outer, read shields 120, 150. The outermost shields 120, 150 for the read transducer 110 are termed read shields. In the implementation shown in FIGS. 2 and 3, three read sensors 112, 114 and 116 and two internal shields 130 and 140 are shown. However, in another implementation, another number of read sensors 112, 114 and 116 and internal shields 130 and 140 may be present. The shields/read shields 120, 130, 140 and 150 generally include soft magnetic material. In some implementations, one or more of the shields 120, 130, 140 and 150 may include ferromagnetic layers that are anti-ferromagnetically coupled.

Current is driven perpendicular-to-plane for the sensors 112, 114 and 116. Thus, current is driven through the sensor 112 between the shields 120 and 130. Similarly, current is driven through the sensor 114 between the shields 130 and 140. Current is also driven through the sensor 116 between the shields 140 and 150. Thus, electrical connection is to be made to the shields 120, 130, 140 and 150. However, different currents may be desired to be driven through the sensors 112, 114 and 116. Similarly, the resistances of the sensors 112, 114 and 116 may be desired to be separately sensed. For example, the sensors 112, 114 and 116 may each be desired to be separately coupled to their own preamplifier (preamp). As a result, the sensors 112, 114 and 116 are desired to be electrically isolated from each other. Consequently, the shields 130 and 140 are configured to not only magnetically shield the sensors 112, 114 and 116, but also to provide electrical isolation. As a result, each middle shield 130 and 140 may include multiple conductive magnetic layers separated by one or more insulating layers. Thus, the shield 130 may include conductive magnetic middle shield layers 134 and 136 that are separated by an insulating layer 152. In some embodiments, the insulating layer 152 may be considered a magnetic-spacer layer 152. Similarly, the shield 140 includes conductive magnetic middle shield layers 144 and 146 separated by a magnetic shield layer 162. However, example implementations are not limited to this configuration, and may include configurations without an insulating layer 152, 162 formed between the conductive magnetic middle shield layers 134/144, 136/146. Further, in some embodiments, the conductive magnetic layers 134/144/136/146 may be formed from a conductive metal and may be referred to as metallic middle shield layers.

The insulating layer(s) 152 and/or 162 may also be configured to improve the performance of the shields 130 and/or 140, respectively. For example, a low dielectric constant material may be used for the insulating layers 152 and/or 162. A low dielectric constant material is one which has a dielectric constant less than eight. For example, SiO and/or SiOC might be used for the insulating layer(s) 152 and/or 162. As a result, capacitive coupling between the metallic middle shield layers 134 and 136 and/or the metallic middle shield layers 144 and 146 may be reduced. The thickness of the insulating layer(s) 152 and/or 162 may be varied. More specifically, the thickness of the insulating layer(s) 152 and/or 162 may be increased distal from the sensors 112, 114 and 116. In some implementations, the insulating layer 152 and 162 may be on the order of ten nanometers within five microns of the sensors 112, 114 and 116. Further from the sensors 112, 114 and 116, the thickness may be increased, for example to twenty nanometers. In addition, the material(s) may be changed further from the sensors 112, 114 and 116. For example, the insulating layer 152 may include a ten nanometer thick alumina sub-layer having a dielectric constant of approximately six. At least five microns from the sensors an additional sub-layer of silicon dioxide having a thickness of approximately ten nanometers with a dielectric constant of approximately three may be added. Thus, the insulating layer(s) 152 and/or 162 may have varying thicknesses and/or materials.

Additionally, in each shield 130 and 140, an electrical contact layer is formed between each sensor 112,114,116 and respective middle shield layers 134,136,144,146. For example, electrical contact layer 132 is formed between sensor 112 and middle shield layer 134. Similarly, electrical contact layer 138 is formed between sensor 114 and middle shield layer 136. Additionally, electrical contact layer 142 is formed between sensor 114 and middle shield layer 144. Further, electrical contact layer 148 is formed between sensor 116 and middle shield layer 148. In the illustrated embodiments, the electrical contact layers 132, 138, 142, 148 are illustrated as separate layers. However, the electrical contact layers 132, 138, 142, 148 are not limited to this configuration, and may be formed as a portion of the respective adjacent middle shield layers 134, 136, 144, 146.

In some implementations, the electrical contact layer is formed form the same materials as the neighboring sensors 112,114,116 and may be formed during the formation of neighboring sensor as discussed in greater detailed below. For example, electrical contact layer 132 may be formed during formation of the sensor 112. Further, electrical contact layers 138 and 142 may be formed during formation of the sensor 114. Additionally, electrical contact layer 148 may be formed during formation of the sensor 116.

The read transducer 110 may be used in higher density recording, such as TDMR. Through the placement of the sensors 112, 114 and 116, the transducer 110 may address skew issues that might otherwise adversely affect performance of the transducer 110. Consequently, the impedance and response of the transducer 110 may be sufficient for higher frequency performance. Cross talk may thus be reduced. In addition, the effect on the magnetics and other aspects of the transducer 110 because of the reduced overlap may be mitigated by the configuration of the shields 130 and 140. Performance of the magnetic transducer 110 may thus be improved.

FIG. 4 is a plan view of the exemplary implementation of the microstructure 190 of the present application. The microstructure 190 includes the read transducer 110 and an interconnection region 200 that may be removed during manufacturing of the read transducer 110. Specifically, once all of the layers of the read transducer 110 have been formed, the interconnection region 200 may be removed along plane 180 via known manufacturing methods to form the Air Bearing Surface (ABS) of the read transducer. Of course, embodiments of the present application need not have the interconnection region 200 be removed during processing and manufacturing of the read transducer 110.

As illustrated, each of the electrical contact layers 132/142/138/148 extend from the read transducer 110 into the interconnection region 200. Further, a shunt region 172/174/177/179 may be formed on the portions of the electrical contact layers 132/142/138/148 that extend into the interconnection region 200.

As illustrated, the upper most electrical contact layer 148 extends furthest into the interconnection region 200 and has the shunt region 177 formed thereon. Additionally, the electrical contact layer 142 extends into the interconnection region 200 less than electrical contact layer 132 and has the shunt region 179 formed thereon. Further, the electrical contact layer 138 extends over the shunt region 179 and has shunt region 174 formed thereon. Further, the lower most electrical contact layer 132 extends least furthest into the interconnection region 200 and has the shunt region 172 formed thereon. The lower most electrical contact layer 132 is the electrical contact layer closest to the lower outer shield 120. As discussed in the above embodiments, the electrical contact layers 132, 138, 142, 148 are illustrated as separate layers. However, the electrical contact layers 132, 138, 142, 148 are not limited to this configuration, and may be formed as a portion of the respective adjacent middle shield layers 134, 136, 144, 146.

Further, an electrical connection 170 is formed between the shunt region 172 and the shunt region 174. Additionally, and electrical connection 175 is formed between the shunt region 177 and the shunt region 177. In some embodiments, the electrical connections 170 and 175 may be formed as an electrically conductive layer, which provides minimal resistance and shorts together the respective shunt regions. In other embodiments, the electrical connections 170 and 175 may be formed from an electrically resistive layer that provides a specific level of resistance. For example, each electrical connection 170, 175 may be formed from the same materials as the read sensors and may provide a defined resistance value. For example, each electrical connection 170/175 may have provided an electrical resistance substantially equal to 10 kΩ plus or minus normal manufacturing tolerances.

By providing shunt regions 172/174/177/179 with electrical connections 170/175 therebetween, Electrical Overstress (EOS) or Electrostatic Discharge (ESD) during manufacturing may be reduced. Further, by provided a defined resistance between the shunt regions 172/174/177/179, the electrical properties of read transducer 110 may be measured during manufacturing prior to completion.

Additionally, in some embodiments an electrical connection (not shown) may be provided between the outer read shields 120 and 150 in the interconnection region 200 to electrically short together the outer read shields 120 and 150. Such an electrical connection or short between the outer read shields 120 and 150 may provide additional protection against EOS and ESD.

Figure 5A:
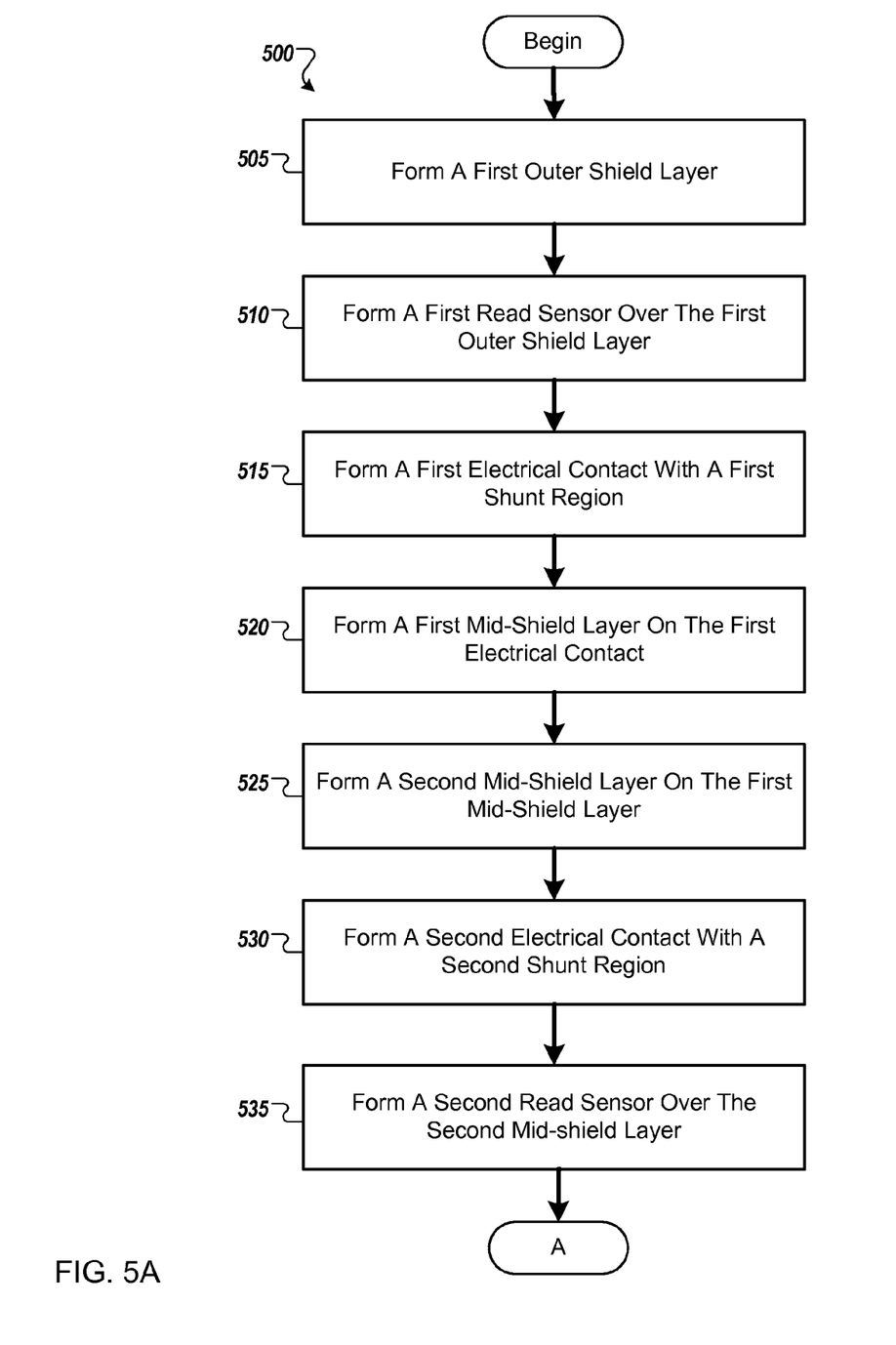
FIGS. 5A and 5B are flow charts illustrating an exemplary implementation of a method for manufacturing a magnetic head according to the present application.
Figure 5B:
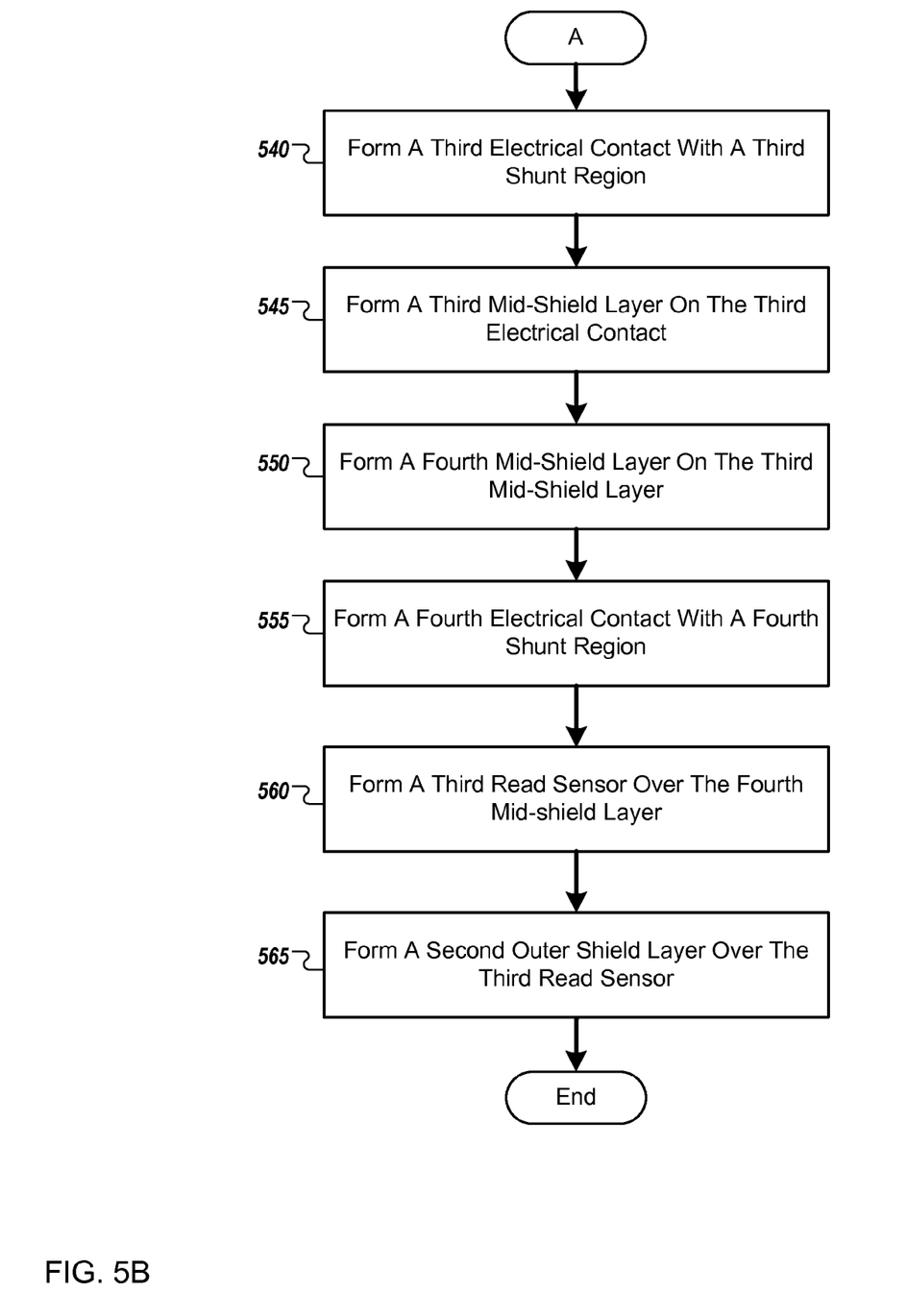

FIGS. 5A and 5B illustrate an exemplary implementation of a method 500 for manufacturing the read transducer. For simplicity, some steps may be omitted, interleaved, and/or combined. The method 500 is also described in the context of providing a single recording transducer having two read sensors. However, the method 500 may be used to form a portion or a complete two-dimensional transducer, such as TDMR transducers 110 illustrated in FIGS. 2-3 and/or the microstructure 190 of FIG. 4. Further, the method 500 may also be used to fabricate multiple transducers at substantially the same time. The method 500 may also be used to fabricate other transducers, as may be apparent to a person of ordinary skill in the art. The method 500 is also described in the context of particular layers. A particular layer may include multiple materials and/or multiple sub-layers. The method 500 also may start after formation of other portions of the magnetic recording transducer.

In 505, a first outer shield layer 120 is formed. The first outer shield layer 120 may generally be formed from a soft-magnetic material including, but not limited to, Iron alloys, Nickel alloys, or any other soft-magnetic metal that may be apparent to a person of ordinary skill in the art. Further, the application process of the first outer shield layer 120 is not particularly limited and may include any process that may be apparent to a person of ordinary skill in the art including sputtering or any other known process.

Further, in 510, a first read sensor 112 is formed on the first outer shield layer 120. As discussed above, each read sensor 112, 114 and 116 may include a pinning layer, a pinned layer, a nonmagnetic spacer layer and a free layer 113, 115, and 117, respectively. The pinning layer is generally an AFM layer that is magnetically coupled to the pinned layer. In other implementations, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. Further, the formation process of the first read sensor 112 is not particularly limited and may include any process that may be apparent to a person of ordinary skill in the art including sputtering or any other known process.

After the first read sensor 112 is formed, a first electrical contact layer 132 may be formed over the first read sensor 112 in 515. The first electrical contact layer 132 may generally be formed from a soft-magnetic material including, but not limited to, Iron alloys, Nickel alloys, or any other soft-magnetic metal that may be apparent to a person of ordinary skill in the art. Further, the application process of the first electrical contact layer 132 is not particularly limited and may include any process that may be apparent to a person of ordinary skill in the art including sputtering or any other known process.

The first electrical contact layer 132 is formed to extend into the interconnection region 200 illustrated in FIG. 4. Further during the formation of the first electrical contact layer 132, the shunt region 172 is also formed using the same materials as the electrical contact layer. In some embodiments, the formation of the first electrical contact layer 132 may formed during the formation of the read sensor 112 and in some embodiments the formation of the first electrical contact layer 132 may be a separate, discrete process from the sensor 112 formation.

In 520, a first metallic middle-shield layer 134 is formed over the first electrical contact layer 132. The first metallic middle-shield layer 134 may generally be formed from a soft-magnetic material including, but not limited to, Iron alloys, Nickel alloys, or any other soft-magnetic metal that may be apparent to a person of ordinary skill in the art. Further, the application process of the first metallic middle-shield layer 134 is not particularly limited and may include any process that may be apparent to a person of ordinary skill in the art including sputtering or any other known process.

As discussed above, the first electrical contact layer 132 is illustrated as a separate layer. However, the first electrical contact layers 132 is not limited to this configuration, and may be formed as a portion of the adjacent first metallic middle-shield layer 134.

In 525, a second metallic middle-shield layer 136 is formed above the first metallic middle-shield layer 134. In some implementations, the insulation layer 152 may be formed between the first and second metallic middle-shield layers 134, 136. The second metallic middle-shield layer 136 may generally be formed from a soft-magnetic material including, but not limited to, Iron alloys, Nickel alloys, or any other soft-magnetic metal that may be apparent to a person of ordinary skill in the art. Further, the application process of the second metallic middle-shield layer 136 is not particularly limited and may include any process that may be apparent to a person of ordinary skill in the art including sputtering or any other known process.

In 530, a second electrical contact layer 138 may be formed over the second middle-shield layer 136. The second electrical contact layer 138 may generally be formed from a soft-magnetic material including, but not limited to, Iron alloys, Nickel alloys, or any other soft-magnetic metal that may be apparent to a person of ordinary skill in the art. Further, the application process of the second electrical contact layer 138 is not particularly limited and may include any process that may be apparent to a person of ordinary skill in the art including sputtering or any other known process.

The second electrical contact layer 138 is formed to extend into the interconnection region 200 illustrated in FIG. 4. Further during the formation of the second electrical contact layer 138, the shunt region 174 is also formed using the same materials as the electrical contact layer. Additionally the electrical connection 175 may also be formed during the formation of the second electrical contact layer 138.

As discussed above, the second electrical contact layer 138 is illustrated as a separate layer. However, the second electrical contact layers 138 is not limited to this configuration, and may be formed as a portion of the adjacent second metallic middle-shield layer 136.

Further, in 535, a second read sensor 114 is formed above the second middle-shield shield layer 136. In some embodiments, the second electrical contact layer 138 may formed during the formation of the second read sensor 114 in 535 and in some embodiments the formation of the second electrical contact layer 138 may be a separate, discrete process from the sensor 114 formation.

As discussed above, each read sensor 112, 114 and 116 may include a pinning layer, a pinned layer, a nonmagnetic spacer layer and a free layer 113, 115, and 117, respectively. The pinning layer is generally an AFM layer that is magnetically coupled to the pinned layer. In other implementations, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. Further, the formation process of the second read sensor 114 is not particularly limited and may include any process that may be apparent to a person of ordinary skill in the art including sputtering or any other known process.

After the second read sensor 114 is formed, a third electrical contact layer 142 may be formed over the second read sensor 114 in 540. The third electrical contact layer 142 may generally be formed from a soft-magnetic material including, but not limited to, Iron alloys, Nickel alloys, or any other soft-magnetic metal that may be apparent to a person of ordinary skill in the art. Further, the application process of the third electrical contact layer 142 is not particularly limited and may include any process that may be apparent to a person of ordinary skill in the art including sputtering or any other known process.

The third electrical contact layer 142 is formed to extend into the interconnection region 200 illustrated in FIG. 4. Further during the formation of the third electrical contact layer 142, the shunt region 179 is also formed using the same materials as the electrical contact layer. In some embodiments, the formation of the third electrical contact layer 142 may formed during the formation of the read sensor 114 and in some embodiments the formation of the third electrical contact layer 142 may be a separate, discrete process from the sensor 114 formation.

In 545, a third metallic middle-shield layer 144 is formed over the third electrical contact layer 142. The third metallic middle-shield layer 144 may generally be formed from a soft-magnetic material including, but not limited to, Iron alloys, Nickel alloys, or any other soft-magnetic metal that may be apparent to a person of ordinary skill in the art. Further, the application process of the third metallic middle-shield layer 144 is not particularly limited and may include any process that may be apparent to a person of ordinary skill in the art including sputtering or any other known process.

As discussed above, the third electrical contact layer 142 is illustrated as a separate layer. However, the third electrical contact layers 142 is not limited to this configuration, and may be formed as a portion of the adjacent third metallic middle-shield layer 144.

In 550, a fourth metallic middle-shield layer 146 is formed above the third metallic middle-shield layer 144. In some implementations, the insulation layer 162 may be formed between the third and fourth metallic middle-shield layers 144, 146. The fourth metallic middle-shield layer 146 may generally be formed from a soft-magnetic material including, but not limited to, Iron alloys, Nickel alloys, or any other soft-magnetic metal that may be apparent to a person of ordinary skill in the art. Further, the application process of the fourth metallic middle-shield layer 146 is not particularly limited and may include any process that may be apparent to a person of ordinary skill in the art including sputtering or any other known process.

In 555, a fourth electrical contact layer 148 may be formed over the fourth middle-shield layer 146. The fourth electrical contact layer 148 may generally be formed from a soft-magnetic material including, but not limited to, Iron alloys, Nickel alloys, or any other soft-magnetic metal that may be apparent to a person of ordinary skill in the art. Further, the application process of the fourth electrical contact layer 148 is not particularly limited and may include any process that may be apparent to a person of ordinary skill in the art including sputtering or any other known process.

The fourth electrical contact layer 148 is formed to extend into the interconnection region 200 illustrated in FIG. 4. Further during the formation of the fourth electrical contact layer 148, the shunt region 177 is also formed using the same materials as the electrical contact layer. Additionally the electrical connection 170 may also be formed during the formation of the second electrical contact layer 148.

As discussed above, the fourth electrical contact layer 148 is illustrated as a separate layer. However, the fourth electrical contact layers 148 is not limited to this configuration, and may be formed as a portion of the adjacent fourth metallic middle-shield layer 146.

Further, in 560, a third read sensor 116 is formed above the fourth middle-shield shield layer 146. In some embodiments, the fourth electrical contact layer 148 may formed during the formation of the third read sensor 114 in 560 and in some embodiments the formation of the fourth electrical contact layer 148 may be a separate, discrete process from the sensor 116 formation.

As discussed above, each read sensor 112, 114 and 116 may include a pinning layer, a pinned layer, a nonmagnetic spacer layer and a free layer 113, 115, and 117, respectively. The pinning layer is generally an AFM layer that is magnetically coupled to the pinned layer. In other implementations, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. Further, the formation process of the third read sensor 116 is not particularly limited and may include any process that may be apparent to a person of ordinary skill in the art including sputtering or any other known process.

In 565, a second outer shield layer 150 is formed over the third read sensor 116. The second outer shield layer 150 may generally be formed from a soft-magnetic material including, but not limited to, Iron alloys, Nickel alloys, or any other soft-magnetic metal that may be apparent to a person of ordinary skill in the art. Further, the application process of the second outer shield layer 150 is not particularly limited and may include any process that may be apparent to a person of ordinary skill in the art including sputtering or any other known process. Once the second outer shield layer 150 is formed in 565 the process 500 may end in some implementations. However, in some implementations, the interconnection region 200 may be removed along plane 180 to form the ABS. The removal of the interconnection region 200 may be done through any process that may be apparent to a person of ordinary skill in the art (such as dicing, etching, etc.).

The foregoing detailed description has set forth various implementations of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof.

While certain implementations have been described, these implementations have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

We claim:

1. A layered micro-structure for a magnetic head, the micro-structure comprising:
   a first read sensor and a first electrical contact with a first shunt region;
   a first mid-shield layer formed on the first read sensor, the first mid-shield layer being electrically connected to the first electrical contact;
   a second mid-shield layer formed over the first mid-shield layer; and
   a second read sensor formed over the second mid-shield layer, the second read sensor having a second electrical contact between the second read sensor and the second mid-shield layer, the second electrical contact having a second shunt region electrically connected to the first shunt region; and
   a first electrical connection layer formed between, and electrically connecting, the first shunt region and the second shunt region.

2. The micro-structure of claim 1, wherein the first electrical connection layer comprises an electrically resistive layer formed between the first shunt region and the second shunt region.

3. The micro-structure of claim 1, further comprising:
   a first outer shield layer, wherein the first read sensor is formed over the first outer shield layer; and
   a second outer shield layer formed over the second read sensor.

4. The micro-structure of claim 1, wherein the first shunt region is formed in a region of the micro-structure that is removable to form an air bearing surface; and
   wherein the second shunt region is formed in the region of the micro-structure that is removable to form the air bearing surface.

5. The micro-structure of claim 1, wherein the second read sensor further comprises a third electrical contact having a third shunt region; and
   wherein the micro-structure further comprises:
   a third mid-shield layer formed over the second read sensor, the third mid-shield layer being electrically connected to the third electrical contact;
   a fourth mid-shield layer formed over the third mid-shield layer; and a third read sensor formed over the fourth mid-shield layer, the third read sensor having a fourth electrical contact including a fourth shunt region electrically connected to the third shunt region; and a second electrical connection layer formed between, and electrically connecting, the fourth shunt region and the third shunt region.

6. The micro-structure of claim 5, wherein the first electrical connection layer comprises a first electrically resistive layer formed between the first shunt region and the second shunt region; and wherein the second electrical connection layer comprises a second electrically resistive layer formed between the third shunt region and the fourth shunt region.

7. The micro-structure of claim 5, further comprising:

a first outer shield layer, wherein the first read sensor is formed over the first outer shield layer; and a second outer shield layer formed over the third read sensor.

8. The micro-structure of claim 5, wherein the first shunt region is formed in a region of the microstructure that is removable to form an air bearing surface;

wherein the second shunt region is formed in the region of the micro-structure that is removable to form the air bearing surface;

wherein the third shunt region is formed in the region of the micro-structure that is removable to form the air bearing surface; and wherein the fourth shunt region is formed in the region of the micro-structure that is removable to form the air bearing surface.

9. A storage device comprising:

a storage medium; and a slider disposed proximate to the storage medium, the slider comprising the micro-structure according to claim 1 mounted on the slider.

\* \* \* \* \*